United States Patent Office 3,385,841
Patented May 28, 1968

3,385,841
POLYMERIZATION PROCESS
James Donald Bruton and Donald Hughel Payne, Wilmington, Del., assignors to E. I. du Pont de Nemours and Company, Wilmington, Del., a corporation of Delaware
No Drawing. Filed Apr. 4, 1955, Ser. No. 499,204
10 Claims. (Cl. 260—93.5)

This invention relates to a process for the polymerization of ethylenically unsaturated monomers and particularly to the polymerization of vinyl polymers and to novel compositions of matter obtained by this process.

Heretofore it had been known that polymerization of certain ethylenically unsaturated compounds could be initiated by compounds capable of yielding free radicals. Using these free radicals certain monomers such as ethylene, styrene, methyl methacrylate could be polymerized to high molecular weight solid materials whereas other ethylenically unsaturated compounds such as propylene, isobutylene, and butene could either be not at all polymerized or only polymerized to low molecular weight polymers. A third group of monomers such as butadiene and divinyl benzene form cross linked intractible polymers when polymerized with free radical initiators. Recently a novel polymerization initiator has been described in copending application S.N. 450,243 filed Aug. 16, 1954, now Patent No. 2,905,643, in which a reduced titanium metal complex is disclosed as an initiator which produces extremely high molecular weight substantially unbranched polymers and copolymers of ethylene. This active titanium complex is formed by reducing a tetravalent or trivalent salt or ester of titanium to a valence state below three, and combining the reduced product with an ethylenically unsaturated hydrocarbon. The initiator thus formed is effective for the polymerization of ethylene to high molecular weight polymer. This type of catalyst has been called a coordination catalyst or initiator, because it is believed that the reduced titanium will coordinate with the ethylenically unsaturated hydrocarbon and then cause polymerization of ethylene. The reduction of the tetra- or trivalent titanium to a valence state below three is accomplished by strong reducing agents such as organometallic compounds, metal hydrides, Grignard reagents and metals such as alkali and alkaline earth metals. The polymers obtained by this type of polymerization are characterized by the linearity and high structural regularity of the polymer chains. By using the coordination catalyst it has been possible to obtain crystalline polymers where previously only amorphous polymers could be obtained such as crystalline polystyrene as disclosed in copending application Serial No. 486,284 filed Feb. 2, 1955, now abandoned; furthermore, it has been possible by using coordination initiators to prepare solid, tough polymers from hydrocarbon monomers which heretofore have only been polymerized to low molecular weight form or which have never been polymerized at all such as solid polypropylene, solid polybutene-1, and solid interpolymers of ethylene and styrene, and ethylene and isobutylene. Although in using the above described initiator system certain properties of the polymers such as stiffness are improved, and polymers of higher crystallinity are obtained, it is desirable in other applications to avoid crystallinity in the polymer and to enhance the elastomeric properties of the polymer.

It has been found that certain substituted hydrocarbon monomers such as styrene or isobutylene when polymerized by coordination initiators, polymerize only at very slow rates which may be due to steric factors involved in the polymerization. Thus for polymers where a highly ordered structure of the chain is of minor importance an undesirable limitation is placed on the polymerization when using coordination initiators. A second important limitation observed with the coordination initiator is the low degree of activity of coordination initiators in the polymerization of vinyl monomers containing other elements in addition to hydrogen and carbon such as vinyl ethers, acrylate, and vinyl chloride. It would therefore be extremely desirable to overcome the limitations of the coordination initiator system without losing the advantages gained by the coordination initiator.

It is therefore the objective of the present invention to provide an improved coordination initiator system. It is a further objective of this invention to provide a polymer initiating system which is capable of polymerizing vinyl hydrocarbon monomers to amorphous polymers. A further objective is to provide a monomer system capable of polymerizing vinyl monomers comprising substituents other than carbon and hydrogen at high polymerization rates. Yet another object is to provide useful and novel polymers.

The objects of this invention are accomplished by the addition of a saturated halohydrocarbon, having at least one carbon atom substituted by at least three halogen atoms, wherein the halogen atoms are chlorine, bromine, or iodine, to a coordination initiator system comprising a titanium compound and a reducing agent having at least one metal to hydrocarbon bond in the polymerization of vinyl monomers having one or more substituents. It has now been discovered that by using the initiating system of the present invention, propylene for example can be polymerized to a solid but amorphous and elastomeric polymer. Coordination initiator systems without the addition of a halogenated hydrocarbon such as carbon tetrachloride give rise to solid crystalline polymers of propylene. The initiator system of the present invention furthermore was found to have a high reactivity when used in the polymerization of vinyl hydrocarbon monomers which can add to the polymer chain in more than one way, where unmodified coordination initiator systems as heretofore known have shown only a low degree of activity. It has further been discovered that vinyl monomers containing other elements besides hydrogen and carbon such as carbonyl oxygen and ether oxygen can be polymerized by the modified coordination initiator system of the present invention at extremely rapid rates. Such as phenomena is extremely surprising since it was in general believed that compounds such as ketones and ethers act as catalyst poisons for the usual coordination initiator.

The halogenated compounds useful in achieving a coordination polymerization resulting in an amorphous vinyl polymer are preferably such compounds as carbon tetrachloride, carbon tetrabromide, carbon tetraiodide, trichloromethane and tribromomethane. Halogenated compounds having the necessary —$CX_3$ group, where X is either bromine, chlorine, or iodine such as perchloroethane, 1,1,1-trichloroethane are also useful in the present invention. No added advantages, however, are gained by their use and therefore readily available compounds such as carbon tetrachloride and trichloromethane are preferred.

Titanium compounds useful in the present invention are particularly titanium tri- and tetrahalides such as titanium tetrachloride, titanium trichloride, and titanium tri- and tetra-esters such as tetra butyl titanate. Outstanding examples of the reducing agents useful in the present invention are metal alkyls such as aluminum alkyls, alkali metal alkyls, alkali metal aluminum alkyls as for example lithium aluminum alkyls, and alkali metal boroalkyls. Other useful reducing agents are Grignard compounds such as phenyl-magnesium bromide and alkali metals combined with acetylene and substituted alkenes.

The polymerization reaction is preferably carried out in an inert liquid reaction medium, such as a saturated hydrocarbon or an aromatic hydrocarbon. Preferred reaction media are benzene, toluene, cyclohexane or higher boiling saturated hydrocarbon liquids. To achieve a rapid formation of the catalytically active complex, it is preferred to employ solutions of the catalyst components in the reaction medium. Although it is possible to add the halogenated compound after the addition of the reducing agent to the titanium compound it is in general preferred to add the halogenated compound prior to the addition of the reducing agent, since in the former case an induction period is required to form the initiator of the present invention. The initiator may be formed in situ or prior to the start of the polymerization.

So active as vinyl polymerization initiators are the coordination complexes hereinabove described that they can be used for the polymerization of propylene to solid polymers at room temperature and atmospheric pressures. Higher pressures up to 1000 atmospheres and above may be employed if so desired. Certain vinyl monomers may be more advantageously polymerized at elevated temperatures or at lower temperatures.

The polymerization according to the process of this invention takes place most satisfactorily when the polymerization mixture is substantially moisture-free. As in numerous other polymerization processes the polymerization mixture is kept free of oxygen or the oxygen concentration is kept at a controlled level.

The invention is further illustrated by means of the following examples. All polymerization reactions were carried out in apparatus described in the first example.

Example I.—Polymerization of propylene to amorphous polymer

Into a glass reaction vessel equipped with stirrer, the necessary gas inlet and outlet valves, and a reflux condenser was charged 100 ml. of cyclohexane, 0.25 ml. (0.0023 moles, of titanium tetrachloride, and 5 ml. of carbon tetrachloride. The reaction vessel was flushed with nitrogen and 25 ml. (0.0045 mol.) of lithium aluminum tetraheptyl solution was added. The reaction vessel was then cooled to about 0° C. and propylene was passed through the reaction mixture while maintaining atmospheric pressure and stirring the reaction mixture. After a period of two hours the addition of propylene was stopped and the reaction mixture was poured into a methanol hydrochloric acid mixture which caused the polymer to precipitate. The polymer was filtered, washed and dried. A solid but elastomeric product was obtained. A small sample was placed on a hot stage microscope equipped with crossed polaroids heated to 160° C. and then cooled gradually to room temperature. No indication of any crystallization was found to occur. The polymer thus obtained had the consistency of a high molecular weight polyisobutylene and a density in the range of 0.87. This amorphous polypropylene was found to have high elasticity and a stiffness below 3000 p.s.i. In the absence of the carbon tetrachloride a solid non tacky polymer is obtained having a crystallinity of 20 to 25%.

Example II.—Polymerization of styrene

To 80 ml. of dry cyclohexane was added 0.005 mole of titanium tetrachloride and 20 ml. of carbon tetrachloride. The resulting mixture was placed under dry nitrogen and 0.01 mole of lithium aluminum tetraethylcyclohexenyl dispersed in 120 ml. of cyclohexane was added rapidly with efficient stirring. To this mixture was then added 50 ml. of styrene. The reaction rapidly became exothermic increasing the temperature to 80° C. After 5 minutes the reaction had subsided. The reaction mixture was poured into methanol and the polymer formed precipitated out of solution. The polymer was washed, filtered, and dried. A white solid polymer, weighing 43 grams was obtained. The polymer was found to be amorphous having a softening point at 100° C. and an infrared spectrum equal to that of commercial polystyrene. Films could be molded at 150° C. but were found to be brittle.

The reaction was repeated without the use of carbon tetrachloride. Upon addition of the styrene the temperature remained unchanged. The reaction was stopped after one hour. Less than 1 g. of a solid polymer was isolated.

Example III.—Polymerization of isobutylene

An initiator-reaction medium mixture was prepared as described in Example II. Isobutylene was passed through the reaction mixture at atmospheric pressure for a period of 30 minutes while the temperature of the reaction mixture was maintained at 0 to 5° C. using an ice bath. On precipitation of the polymer by pouring into methanol 94 g. of a solid tacky polymer was obtained. In the absence of the carbon tetrachloride only a small quantity of less than 1 g. of a low molecular weight polymer is formed under identical conditions.

Example IV.—Polymerization of the divinyl ether of diethyleneglycol

To 80 ml. of dry cyclohexane was added 0.005 mole of titanium tetrachloride and 20 ml. of carbon tetrachloride. The resulting mixture was placed under dry nitrogen and 0.01 mole of lithium aluminum tetraethylcyclohexenyl dispersed in 120 ml. of cyclohexane was added rapidly with efficient stirring. To this mixture was added 25 ml. of divinyl ether of diethylene glycol. Polymerization took place immediately as indicated by the rise in temperature of the reaction mixture from 32 to 60° C. After the reaction temperature had decreased to room temperature, the reaction was stopped by pouring the reaction mixture into methanol, upon filtration, washing and drying 20 g. of a solid polymer was obtained.

In the absence of the carbon tetrachloride under identical conditions no significant polymerization took place.

Example V.—Polymerization of methylacrylate

Using the initiator system as described in Example IV, 30 ml. of methylacrylate was added to the reaction mixture. Polymerization took place immediately as indicated by the rise in reaction temperature. The polymerization was stopped after 30 minutes. A brittle solid polymer weighing 2 grams, melting above 200° C. was isolated from the reaction mixture.

Example VI.—Polymerization of methylmethacrylate

Using the initiator system as described in Example IV, 30 ml. of methylmethacrylate was added to the reaction mixture. Polymerization took place immediately as indicated by the rise in reaction temperature. The polymerization was stopped after 30 minutes. Upon precipitation in methanol, washing, filtration and drying 1 gram of solid polymethylmethacrylate was isolated.

Example VII.—Copolymerization of divinylbenzene and isobutylene

To 80 ml. of dry cyclohexane was added under a blanket of nitrogen and under continuous agitation 0.005 mole of titanium tetrachloride and 20 ml. of trichloromethane. To the resulting mixture was then added 0.01 mole of lithium aluminum tetraethyl cyclohexenyl dispersed in 100 ml. of cyclohexane and 20 ml. of divinylbenzene. Isobutylene was then passed through the reaction mixture for a period of five minutes at a temperature of 15 to 25° C. The flow of isobutylene was stopped and agitation was continued for an additional 25 minutes at 20° C. The reaction mixture was poured into methanol and a solid polymer precipitated. On washing 2 grams of a solid elastomeric polymer, was obtained. On heating to dry the polymer, the polymer became extremely brittle indicating a high crosslinked divinylbenzene content.

In the absence of the trichloromethane under similar conditions no polymer formation could be detected.

It is to be observed that the foregoing examples are illustrative only and that numerous embodiments of the invention will occur to those skilled in the art. The products obtained by polymerizing vinyl hydrocarbon monomers with the catalysts hereinabove disclosed are solid polymers and are not necessarily contaminated with Friedel-Crafts type of oily polymers.

The quantity of initiator employed can be varied over a rather wide range, a larger quantity of initiator giving rise to a higher yield of polymer. Suitably, the preferred quantity is within the range of 0.1 to 10% based on the weight of the titanium per unit weight of monomer. The ratio of the titanium to the reducing agent should be such as to be sufficient to reduce at least some and preferably all of the titanium to an active state. In general such reduction is accomplished by using a molar ratio of the titanium compound to the reducing agent from 0.5 to 5. Increasing the ratio may lead to lower molecular weight polymers not suitable for commercial application. The quantity of the halogenated compound is sufficient when equimolar quantities of the titanium compound to the halogenated compound are employed. In general however it is preferred to use excess quantities from 1 to 20 times the weight of the titanium, since no adverse effects on the polymerization and the products thereof have been found by using excess quantities.

The initiator system of the present invention can be employed for the polymerization of vinyl monomers in general such as propylene, butene, isobutylene, styrene, vinyl cyclohexene, divinyl benzene, butadiene, methyl methacrylate and vinyl halides. By using the present initiator system higher polymerization yields are obtained for certain vinyl monomers than are obtainable with the unmodified coordination initiator heretofore known. Interpolymers of two or more vinyl monomers and of ethylene with vinyl monomers may be polymerized to solid polymers by the present system.

As stated hereinabove, novel, amorphous, solid polymers, which heretofore have not been polymerized to a high molecular weight are obtained by the present process. One of the more important novel polymers obtained by the present process is amorphous rubbery polypropylene. The polypropylene obtained by the present process is particularly useful as a rubber base. The elastomeric properties of the polymer may be improved by crosslinking agents such as sulfur and others. The polymers obtained by the present invention may be extruded into films, and molded into articles, used as wire insulation, spun into fibers, etc. The polymers of this invention are further useful in forming composite structures, or foamed structures. They may also be blended with other polymers. The polymers prepared by this process in general have inherent viscosities which exceed 0.4. The nature of the polymer is determined by the character of the initiator and is a different type of polymer as obtained by the unmodified coordination initiator system. Insofar as the components of the initiator can generate free radicals, the free radical variety of polymer can be present, but this can be avoided, if desired by preparing the catalyst prior to use, rather than forming in situ. With such precautions taken to avoid the presence of polymer formed via known sources of free radicals, polymer of optimum quality, from the standpoint of many useful properties is obtained.

We claim:

1. The process for preparing solid, amorphous polymers by polymerizing a terminally unsaturated, substituted vinyl olefin which comprises contacting in inert liquid hydrocarbon medium said olefin with a catalyst produced by admixing in said inert medium (1) titanium tetrachloride with (2) a saturated halohydrocarbon having at least one carbon atom substituted by at least three halogen atoms, wherein the halogen is a member of the class consisting of chlorine, bromine, and iodine, and adding thereto (3) a reducing agent having at least one metal to hydrocarbon bond, said reducing agent being added in sufficient quantity to reduce the titanium of said titanium tetrachloride to a valence state below three, said halohydrocarbon being admixed in at least equimolar quantities on the basis of the titanium tetrachloride, said catalyst being employed in a concentration of 0.1 to 10% based on the weight of titanium per unit weight of substituted vinyl olefin.

2. The process as set forth in claim 1, wherein the compound having at least one metal to hydrocarbon bond is a lithium aluminum tetrahydrocarbon.

3. The process as set forth in claim 2, wherein the lithium aluminum tetrahydrocarbon is lithium aluminum tetraethylcyclohexenyl.

4. The process as set forth in claim 1, wherein the vinyl olefin is styrene.

5. The process as set forth in claim 1, wherein the vinyl olefin is propylene.

6. The process for preparing solid, amorphous polymers by polymerizing terminally unsaturated, substituted monoolefins which comprises contacting said substituted monoolefin, in an inert liquid hydrocarbon medium, with a catalyst produced in said inert medium by admixing (1) titanium tetrachloride with (2) a saturated halohydrocarbon having at least one carbon atom substituted by at least three halogen atoms, wherein the halogen is a member of the class consisting of chlorine, bromine and iodine, and adding thereto (3) an alkali metal aluminum tetrahydrocarbon, at a temperature of 0 to 80° C. and a pressure of 1 to 1,000 atmospheres, the ratio of said titanium tetrachloride to said alkali aluminum tetrahydrocarbon being from 0.5 to 5, said halohydrocarbon being employed in at least equimolar quantities on the basis of the titanium tetrachloride, said catalyst being employed in a concentration of 0.1 to 10% based on the weight of titanium per unit weight of monoolefin.

7. The process for preparing solid, amorphous polymers by polymerizing terminally unsaturated, substituted vinyl monomers selected from the class consisting of hydrocarbon monomers, hydrocarbon ester monomers, and hydrocarbon ether monomers which comprises contacting said vinyl monomer with a catalyst in inert liquid hydrocarbon medium produced by admixing in said inert medium (1) a titanium tetrahalide with (2) a saturated halohydrocarbon having at least one carbon atom substituted by at least three halogen atoms, wherein the halogen is a member of the class consisting of chlorine, bromine, and iodine, and adding thereto (3) a reducing agent having at least one metal to hydrocarbon bond, said reducing agent being added in sufficient quantity to reduce the titanium of said titanium tetrahalide to a valence state below three, said halohydrocarbon being admixed in at least equimolar quantities on the basis of the titanium tetrahalide, said catalyst being employed in a concentration of 0.1 to 10% based on the weight of titanium per unit weight of monomer.

8. The process as set forth in claim 1 wherein the halogenated hydrocarbon is carbon tetrachloride.

9. The process as set forth in claim 1 wherein the halogenated hydrocarbon is trichloromethane.

10. The process as set forth in claim 7 wherein the vinyl monomer is methylmethacrylate.

References Cited

UNITED STATES PATENTS

| | | | |
|---|---|---|---|
| 2,727,024 | 12/1955 | Field et al. | 260 |
| 2,728,757 | 12/1955 | Field et al. | 260 |
| 2,728,758 | 12/1955 | Field et al. | 260 |
| 2,731,452 | 1/1956 | Field et al. | 260 |
| 2,440,498 | 4/1948 | Young et al. | 260—683.15 |
| 2,699,457 | 1/1955 | Ziegler et al. | 260—94.9 |
| 2,721,189 | 9/1955 | Anderson et al. | 260—93.1 |

JOSEPH L. SCHOFER, *Primary Examiner.*

J. R. LIEBERMAN, M. LIEBMAN, M. S. STERMAN,
*Examiners.*

M. B. KURTZMAN, F. H. JABAS,
*Assistant Examiners.*